Feb. 26, 1957
R. O. LEWIS
2,782,661
FLOATING WORK TABLE
Filed Aug. 23, 1954
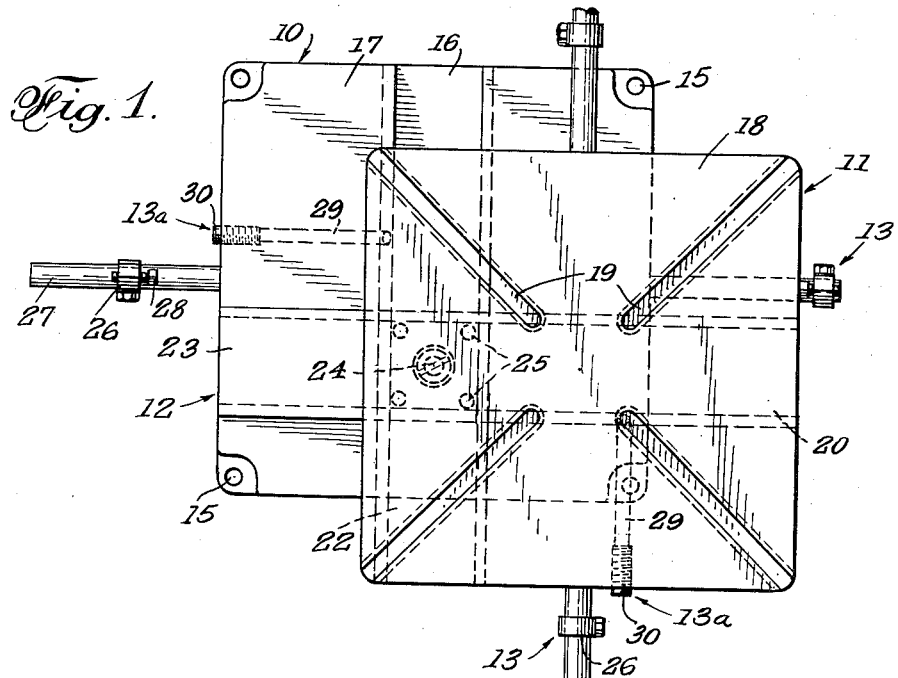
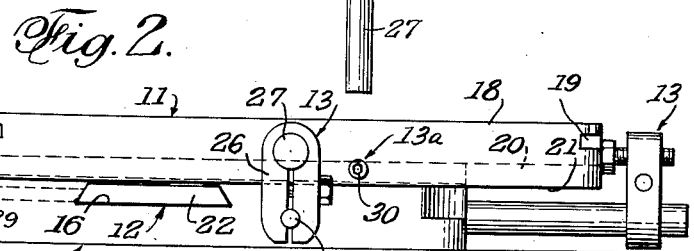
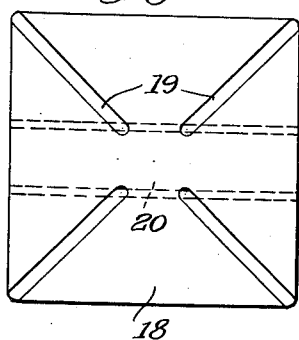
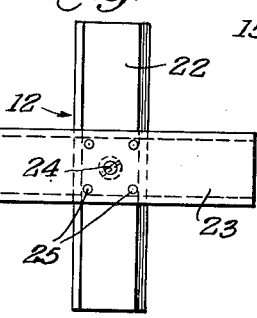
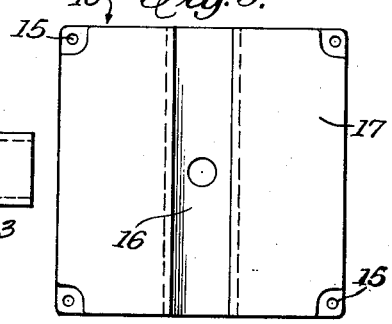
INVENTOR.
RICHARD O. LEWIS.
BY
C. G. Stratton
ATTORNEY

United States Patent Office 2,782,661
Patented Feb. 26, 1957

2,782,661

FLOATING WORK TABLE

Richard O. Lewis, Bell, Calif.

Application August 23, 1954, Serial No. 451,637

6 Claims. (Cl. 77—63)

This invention relates to a floating work table for drill presses and like machines to support a piece of work in desired position with respect to a drill or other tool.

It is an object of the present invention to provide a work table that comprises an auxiliary or attachment to the table of a drill press, milling machine, etc. and is adapted for universal horizontal floating adjustability with respect to a tool of the press or machine and, thereby, having a compound movement. The table contemplated may be used in conjunction with drilling or tapping fixtures and may be used instead of the more time-wasting parallels.

Another object of the invention is to provide a compound table embodying means enabling pre-adjustment of a plurality of stops against which the work-supporting element of said table is adapted to be selectively positioned. Thus, a piece of work, once mounted on the table may have a plurality of operations performed thereon, each at different parts of said piece of work.

The invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description. However, the drawing merely shows and the following description merely describes one embodiment of the present invention, which is given by way of illustration or example only.

In the drawing, like reference characters designate similar parts in the several views.

Fig. 1 is a top plan view of a compound table according to the present invention.

Fig. 2 is an enlarged side elevational view thereof.

Figs. 3, 4 and 5 are plan views, to a reduced scale, of the top plate, slide unit, and bottom plate, respectively, of said table.

The present compound table comprises, generally, a base plate 10, a top plate 11, a slide unit 12 interconnecting said plates, stop means 13 to limit the horizontal position of the top plate relative to the bottom plate, and means 13a to lock the plates and slide unit against movement.

The base plate 10 is preferably formed as a rigid rectangular member adapted to be removably secured as to the top face 14 of the table of a drill press, milling machine, etc. Bolts, passing through holes 15 provided at the corners of said plate, may serve to effect such fixed positioning of plate 10 on table 14. According to the invention, a slideway 16 is provided in the upper surface 17 of said base plate 10, said slideway preferably extending between two opposite side edges of said base plate.

The top plate 11 is shaped similarly to plate 10. Although the same way may be different in size, it is preferably the same size as plate 10, as shown. The top face 18 of said plate 11 is provided with suitable T-sectioned slots 18 that are used to anchor the heads of T-bolts used for securing a piece of work on said plate 11. According to the invention, said plate 11 is provided with a slideway 20 in the lower surface 21 of said top plate 11.

The slide unit 12 comprises two similar slide members 22 and 23 that are connected in cruciform arrangement as by a screw 24 and dowel pins 25 where said members cross. Since the members 22 and 23 are connected at their central parts, the cross formed is symmetrical and resembles the Greek cross except that the members 22 and 23 are in different planes.

By providing the slideways 16 and 20 with sloping sides that impart a dovetail form to said slideways, and providing the members 22 and 23 with a cross-sectional form that is similar, the plates 10 and 11 are connected against upward movement of the plate 11. As can be seen from Fig. 4, the slide members 22 and 23 are arranged so that the narrow face of one is directed toward the narrow face of the other to provide for the above-mentioned non-separation of plates 10 and 11. It will be seen that the slideways 16 and 20 are each undercut by reason of the dovetail sides thereof.

With one of the members 22 or 23 in slideway 16 and the other in slideway 20, top plate 11 may move to any horizontal position relative to base plate 10, since the slide members in slideway 16 and 20 enable a compound movement of said top plate 11. It will be clear that top plate 11 cannot turn as well as being unable to raise because of the undercut slideways. Thus, should a tap or drill "hang-up" in a piece of work secured to said table top, the same remains steady and will not raise or turn.

The stop means 13 comprises a plurality of stops 26 adjustably carried on pins 27 extending laterally from the side edges of the plates 10 and 11. Each stop 26 is adjustable along the pin 27 on which it is mounted and may be rotated out of operative position, if desired. The particular stop means shown provide for fine adjustment of the stop screw 28 to provide for desired accurate location of the top plate 11 and the work piece carried thereby.

In the present case, each plate carries two oppositely disposed stop means so that the stop screws 28 thereof are adapted to engage two opposite side edges of the other plate, the screws 28 carried by plate 10 comprising stops for plate 11 and the screws 28 carried by plate 11 having stopping engagement with plate 10. Therefore, one opposed pair of stops limits movement of plate 11 in one direction, and the other pair of stops limits movement of said plate in the transverse direction.

Each of the stops 26 is shown with a single stop screw 28. By providing said stop 26 with a plurality of screws 28 which can be differently adjusted, and providing for indexing of stop 26, the same stop, depending on which of its plurality of screws is in plate-engaging position, can be used to locate the table 11 in different positions.

The locking means 13a is here shown as a pin 29 directed to impinge on one sloping edge of each slide member 22 and 23. A screw 30 is used to move each pin to locking position. When said screws 30 are backed off, top plate may be moved in both directions of slide members 22 and 23 against two adjacent stops 26. When said screws are tightened, the plate 11 is locked and an operation may be performed on a piece of work mounted on said plate with assurance that the work will not move relative to the tool nor relative to the table 14.

While the foregoing has illustrated and described what is now contemplated to be the best mode of carrying out the invention, the construction is, of course, subject to modification without departing from the spirit and scope of the invention. It is, therefore, not desired to restrict the invention to the particular form of construction illustrated and described, but to cover all modifications that may fall within the scope of the appended claims.

Having thus described the invention, what is claimed and desired to be secured by Letters Patent is:

1. A work table comprising two similar plates, each provided with a slideway in one face thereof, one of said plates being adapted to be fixedly mounted on the table of a machine having a tool, the other plate being adapted to mount a piece of work on which said tool is operable, and a slide unit comprising two similar slide members in cruciform arrangement and in different planes, one said slide member being slidably movable in the slideway of one plate and the other slide member being similarly movable in the slideway of the other plate, said slideways being undercut along their sides and the slide members being formed to interfit said undercut sides to connect the plates against transverse separation.

2. A work table according to claim 1: each table carrying stop means engageable with the other table to limit relative displacement of the tables along their slideways.

3. A work table according to claim 1: means carried by each table to lock the slide member in the slideway thereof against movement in said slideway.

4. A work table according to claim 1: each table carrying stop means engageable with the other table to limit relative displacement of the tables along their slideways, and means carried by each table to lock the slide member in the slideway thereof after adjustment of one plate relative to the other, as limited by the stop means.

5. A work table comprising a rectangular horizontal base plate having a slideway extending between two side edges across the upper face of said plate, a slide member movable along said slideway, a similar slide member affixed to the first slide member in cruciform arrangement, a rectangular top plate having a slideway extending between two side edges across the bottom face thereof, said second slide member being disposed in the latter slideway, said top plate thereby having universal horizontal movement relative to the base plate, means to limit such movement, said means comprising adjustable stops carried by one plate to engage two opposite side edges of the other plate and adjustable stops carried by the other two opposite edges of the latter plate to engage two opposite sides of the first-mentioned plate, and means to lock the plates to the slide members in the slideways thereof.

6. A work table comprising a rectangular horizontal base plate having a slideway extending between two side edges across the upper face of said plate, a slide member movable along said slideway, a similar slide member affixed to the first slide member in cruciform arrrangement, a rectangular top plate having a slideway extending between two side edges across the bottom face thereof, said second slide member being disposed in the latter slideway, said top plate thereby having universal horizontal movement relative to the base plate, said slide members each having a dovetail sectional form with the narrow sides of said form adjacent to each other, and the slideways being formed in cross-section to conform to said slide members, means to limit such movement, said means comprising adjustable stops carried by one plate to engage two opposite side edges of the other plate and adjustable stops carried by the other two opposite edges of the latter plate to engage two opposite sides of the first-mentioned plate, and means to lock the plates to the slide members in the slideways thereof.

References Cited in the file of this patent

UNITED STATES PATENTS

| | | |
|---|---|---|
| 658,277 | Newton | Sept. 18, 1900 |
| 1,050,828 | Hendrickson | Jan. 21, 1913 |
| 1,187,856 | Moss | June 20, 1916 |
| 1,397,771 | Mort | Nov. 22, 1921 |